(12) United States Patent
Wilson (10) Patent No.: US 10,788,570 B2
(45) Date of Patent: Sep. 29, 2020

(54) RADAR SYSTEM FOR MOBILE PLATFORM AND METHOD OF USE

(71) Applicant: THE BOEING COMPANY, Chicago, IL (US)

(72) Inventor: Michael John Wilson, Brisbane (AU)

(73) Assignee: THE BOEING COMPANY, Chicago, IL (US)

( * ) Notice: Subject to any disclaimer, the term of this patent is extended or adjusted under 35 U.S.C. 154(b) by 314 days.

(21) Appl. No.: 15/720,331

(22) Filed: Sep. 29, 2017

(65) Prior Publication Data

US 2019/0101622 A1    Apr. 4, 2019

(51) Int. Cl.

| G01S 7/41 | (2006.01) |
|---|---|
| G01S 13/933 | (2020.01) |
| G01S 13/937 | (2020.01) |
| G01S 13/89 | (2006.01) |
| G01S 13/931 | (2020.01) |
| G01S 13/93 | (2020.01) |
| G01S 13/86 | (2006.01) |
| G01S 13/935 | (2020.01) |
| G01S 13/00 | (2006.01) |

(52) U.S. Cl.
CPC .............. *G01S 7/414* (2013.01); *G01S 13/86* (2013.01); *G01S 13/89* (2013.01); *G01S 13/93* (2013.01); *G01S 13/931* (2013.01); *G01S 13/933* (2020.01); *G01S 13/937* (2020.01); *G01S 13/935* (2020.01)

(58) Field of Classification Search
None
See application file for complete search history.

(56) References Cited

U.S. PATENT DOCUMENTS

| 3,325,806 | A | * | 6/1967 | Wilmot | ................. | G01S 7/2923 |
|---|---|---|---|---|---|---|
| | | | | | | 342/94 |
| 4,068,231 | A | | 1/1978 | Wilmot | | |
| 4,074,264 | A | * | 2/1978 | Wilmot | ................. | G01S 7/2923 |
| | | | | | | 342/159 |

(Continued)

FOREIGN PATENT DOCUMENTS

| JP | 05312493 B2 | 10/2013 |
|---|---|---|
| WO | 2006110973 A1 | 1/2008 |

OTHER PUBLICATIONS

P. Weber, A. Premji, T. Nohara, and C. Krasnor, "Low-Cost Radar Surveillance of Inland Waterways for Homeland Security Applications," in IEEE Radar Conference, Philadelphia, PA, 2004, pp. 134-139.

(Continued)

*Primary Examiner* — Bernarr E Gregory
(74) *Attorney, Agent, or Firm* — Armstrong Teasdale LLP (57) ABSTRACT

A radar system for a mobile platform and methods of operating the radar system are provided. The radar system includes a radar sensor configured to collect data associated with an environment through which the mobile platform moves, and a motion sensor configured to detect motion of the mobile platform. The radar system also includes a processor configured to generate a base clutter map based on a first data collection by the radar sensor, and update the base clutter map based on a second data collection and the motion of the mobile platform detected by the motion sensor.

20 Claims, 5 Drawing Sheets

(56) References Cited

U.S. PATENT DOCUMENTS

| | | | | |
|---|---|---|---|---|
| 4,122,450 | A | * | 10/1978 | Kowalski .............. G01S 7/2927 |
| | | | | 342/159 |
| 4,151,523 | A | * | 4/1979 | Platt ..................... G01S 7/2927 |
| | | | | 342/159 |
| 4,488,154 | A | * | 12/1984 | Ward ................. G01S 13/5248 |
| | | | | 342/162 |
| 4,542,382 | A | * | 9/1985 | Hol .................... G01S 13/5248 |
| | | | | 342/162 |
| 4,749,994 | A | * | 6/1988 | Taylor, Jr. ............. G01S 7/2927 |
| | | | | 342/195 |
| 5,311,188 | A | | 5/1994 | Meijer et al. |
| 6,268,803 | B1 | | 7/2001 | Gunderson et al. |
| 6,307,501 | B1 | | 10/2001 | Wills et al. |
| 6,906,659 | B1 | * | 6/2005 | Ramstack ............... G01S 13/87 |
| | | | | 342/175 |
| 7,741,992 | B2 | | 6/2010 | Wang et al. |
| 7,940,206 | B2 | | 5/2011 | Nohara et al. |
| 7,978,124 | B2 | | 7/2011 | Cook et al. |
| 7,990,311 | B2 | * | 8/2011 | Pauli .................. G01S 13/9307 |
| | | | | 342/159 |
| 8,384,585 | B2 | | 2/2013 | Nohara et al. |
| 9,746,554 | B2 | | 8/2017 | Millar et al. |
| 10,317,520 | B2 | * | 6/2019 | Capraro ................ G01S 13/867 |

| | | | |
|---|---|---|---|
| 2003/0055540 A1 | * | 3/2003 | Hansen .............. B64D 45/0031 |
| | | | 701/3 |
| 2006/0064245 A1 | | 3/2006 | Gilbert |
| 2006/0119473 A1 | | 6/2006 | Gunderson et al. |
| 2007/0139258 A1 | * | 6/2007 | Tsai ...................... G01S 7/2922 |
| | | | 342/159 |
| 2010/0073218 A1 | * | 3/2010 | Stockmann ........... G01S 7/2923 |
| | | | 342/146 |
| 2010/0204867 A1 | | 8/2010 | Longstaff |
| 2016/0320471 A1 | | 11/2016 | Preussner |

OTHER PUBLICATIONS

T. J. Nohara, R. C. Beason, and P. Weber, "Using radar cross-section to enhance situational awareness tools for airport avian radars," Human-Wildlife Interactions, vol. 5, No. 2, pp. 210-217, 2011.

Y. Zhou, X. Liu, J. Suo, C. Liu, X. Su and L. Liu, "Nonparametric background model based duller map for X-band marine radar," 2015 IEEE International Conference on Image Processing (ICIP), Quebec City, QC, 2015, pp. 123-127.

M. Wilson, "Here they come! How a Mobile Aircraft Tracking System can Assist UAS Operations," in AUVSI's Unmanned Systems North America, Washington DC, 2011.

* cited by examiner

RADAR SYSTEM FOR MOBILE PLATFORM AND METHOD OF USE

BACKGROUND

The field of the disclosure relates generally to radar surveillance and, more specifically, to a radar system for a mobile platform, and methods of use.

Many known ground vehicles, marine vehicles, and aircraft need to know where other objects or vehicles are in the area, e.g., in the air, on the water, or on the ground for purposes of collision avoidance and navigation, for example.

One approach is to give the aircraft some form of surveillance capability, such as tracking radar, e.g., Doppler radar. Doppler radars use a Doppler shift of moving objects to distinguish between extraneous clutter (reflections from the ground, buildings, the sea, etc.) and moving objects (aircraft, ships, vehicles, birds, etc.). Doppler radar systems tend to be complex and expensive and only detect object movement toward and away from the radar. Such systems are typically expensive, large, heavy, have high-power demands, and/or have high processing demands.

Land-based collision avoidance systems are typically fixed installations. Marine-based radar systems are designed to operate on ships in a marine environment that is significantly simpler than a land environment. Although ships move, i.e., translate and rotate, sampling rates are adjusted to be high enough to compensate for the velocity. The sea provides a simple radar environment with limited clutter. Conversely, on land, there are undulations that complicate the environment, although such features are static and unchanging over time. Such land-based and marine-based collision avoidance systems generate a radar product to characterize the surrounding environment. The land-based systems generate a clutter map to characterize the surrounding environment. As used herein, a "clutter map" is defined as a two-dimensional representation in range and azimuth of objects in an environment, wherein the objects may include any object in the environment such as terrain, animals, trees, buildings, man-made structures, and/or weather, as well as targets such as aircraft, ships, ground vehicles, and/or people. Marine radar systems may be modified with additional processing systems for a land-based fixed installation. These radars develop clutter maps that enable the system to distinguish between ground clutter and moving objects. This detection method fails, however, if the radar is mobile. When the platform moves, the environment changes and the prior clutter map is invalid. For example, when the platform moves along the ground, the undulations in the terrain change, thereby invalidating the previously computed clutter map.

BRIEF DESCRIPTION

According to one aspect of the present disclosure, a radar system for a mobile platform is provided. The radar system includes a radar sensor configured to collect data associated with an environment through which the mobile platform moves, and a motion sensor configured to detect motion of the mobile platform. The radar system also includes a processor configured to generate a base clutter map based on a first data collection by the radar sensor, and update the base clutter map based on a second data collection and the motion of the mobile platform detected by the motion sensor.

According to another aspect of the present disclosure, a method of operating a radar system on a mobile platform is provided. The method includes collecting, by a radar sensor, a first data collection associated with an environment, and generating, by a processor, a base clutter map based on the first data collection. The method also includes collecting, by the radar sensor, a second data collection associated with the environment, and detecting, by a motion sensor, motion of the mobile platform occurring in a time between collections. The method further includes updating, by the processor, the base clutter map based on the second data collection and the motion of the mobile platform detected by the motion sensor.

According to yet another aspect of the present disclosure, at least one non-transitory computer-readable storage media having computer-executable instructions embodied thereon is provided. When executed by at least one processor, the computer-executable instructions cause the processor to generate a base clutter map based on a first data collection associated with an environment through which a mobile platform moves, the first data collection received from a radar sensor coupled to the mobile platform, and receive a second data collection associated with the environment from the radar sensor. The computer-executable instructions further cause the processor to receive motion of the mobile platform and detected by a motion sensor coupled to the mobile platform, and update the base clutter map based on the second data collection and the motion of the mobile platform detected by the motion sensor.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
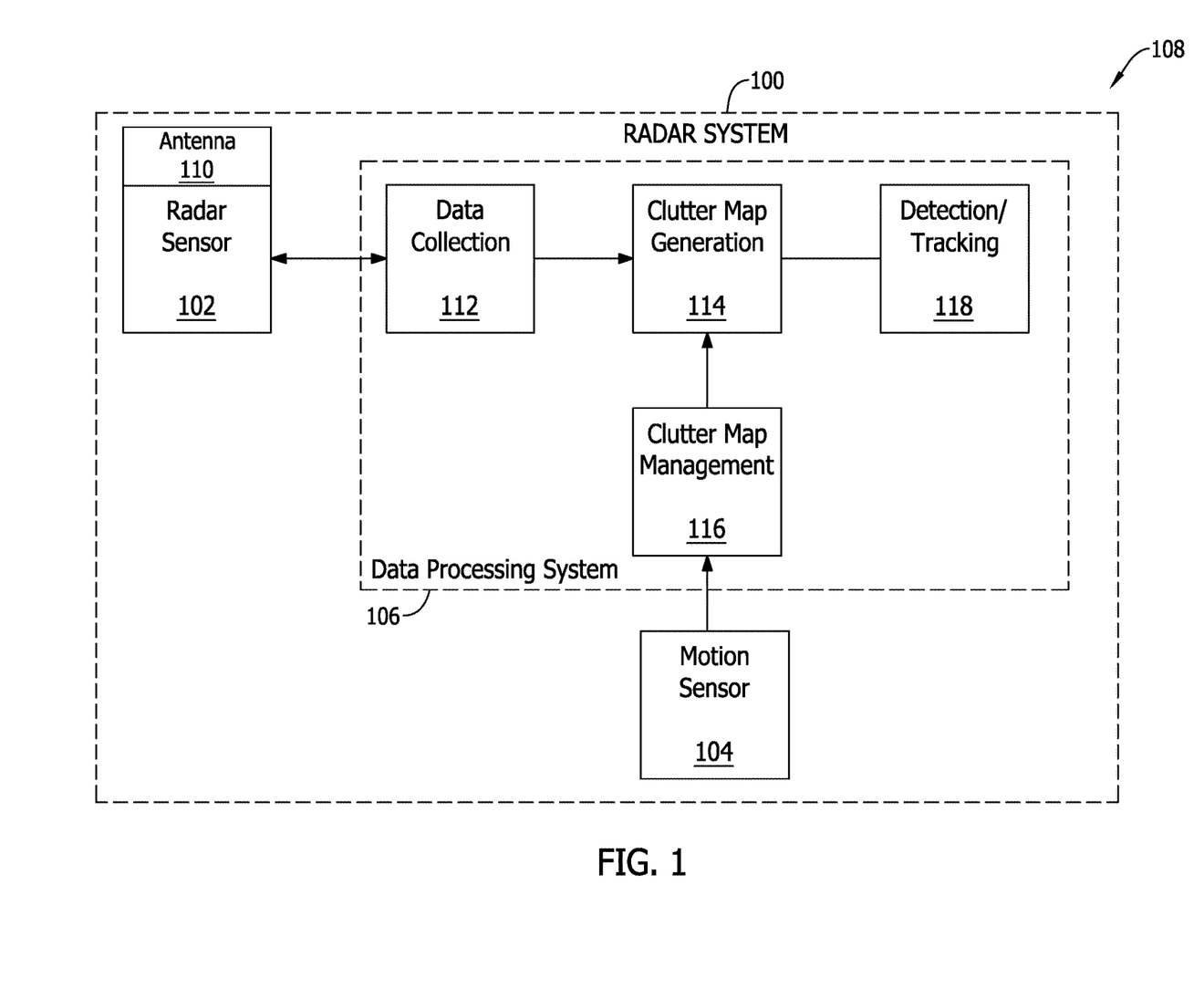
FIG. 1 is a block diagram of an exemplary radar system for a mobile platform.

FIG. 1 is a block diagram of an exemplary radar system 100 for a mobile platform. In the exemplary implementation, the radar system 100 includes a radar sensor 102 and a motion sensor 104, both of which are coupled to a data processing system 106.

In the exemplary implementation, the radar system 100 is coupled onboard a mobile platform 108 that is capable of high-speed movement. For example, the mobile platform 108 may include, but is not limited to, an unmanned aerial vehicle (UAV), an aircraft, a helicopter, an automobile, a tank, a truck, a spacecraft, a satellite, a space shuttle, a ship, or any other type of suitable mobile platform. The radar system 100 is operable both when the mobile platform 108 is in motion and when it is stationary. In other implementations, the radar system 100 may be used in non-transportation applications, such as stationary tracking systems for ground-based radar systems used to track moving vehicles such as aircraft or automobiles, where the mobile platform 108 would take the form of a bridge, a structure, a building, or any other type of stationary platform.

In the exemplary implementation, the radar sensor 102 is a commercial off-the-shelf marine radar that operates at X-band and/or S-Band. In alternative embodiments, other known off-the-shelf radars may be similarly modified. In some embodiments, the radar is operable to scan in range and azimuth to produce two-dimensional products. In other embodiments, the radar may be operable to scan in range, azimuth, and elevation to produce three-dimensional products. The radar sensor 102 is configured to collect data associated with an environment. To do so, the radar sensor 102 transmits signals, such as electromagnetic signals that reflect from objects and/or targets in the environment and are received by the radar sensor 102 to provide data related to the positions of the objects and/or targets.

The radar sensor 102 includes an antenna 110 that is configured to transmit and receive the electromagnetic signals. The antenna 110 may be either a continuously rotating or sector scanning antenna. In the exemplary implementation, the antenna 110 is configured to receive electromagnetic radiation reflected from any objects in the area, including any targets. This electromagnetic radiation may be received in the form of electromagnetic waves. These electromagnetic waves may be referred to as "radar returns" or "radar echoes." The radar returns received back by the radar sensor 102 provide object data, such as a size and/or distance of a detected object from the radar sensor 102. The radar returns are sensed as a function of range and azimuth. For example, a first full, 360° rotation of the antenna 110 generates a first data collection of the environment, a second full rotation of the antenna 110 generates a second data collection, etc.

The motion sensor 104 is configured to detect motion of the mobile platform 108 occurring in a time between collections as it moves through the environment. The motion sensor 104 may include, but is not limited to, an Inertial Measurement Unit (IMU), an Inertial Navigation System (INS), a Global Positioning System (GPS), a map registration system, a triangulation system, and/or the like. The motion sensor 104 detects platform motion data, which indicates a position and orientation of the mobile platform 108 relative to a fixed reference point or a coordinate system. In some implementations, the fixed reference point or coordinate system is defined for the radar sensor 102 when the first data collection is collected as either an origin of a coordinate system and a position and orientation of the radar sensor 102. The motion sensor 104 is configured to detect the platform motion data and transmit it to the data processing system 106 each time a data collection occurs to enable each particular data collection to be correlated to the motion of the mobile platform 108.

The data processing system 106 is communicatively coupled to both the radar sensor 102 and the motion sensor 104. The data processing system 106 is implemented as a processor or other computing device that operates under control of a computer program product. In the exemplary implementation, the data processing system 106 communicates with the radar sensor 102 and the motion sensor 104 to perform various functions of the radar system 100 including, but not limited to, a data collection function 112, a clutter map generation function 114, a clutter map management function 116, and a detection and tracking function 118.

The data collection function 112 includes the data processing system 106 controlling the radar sensor 102 to generate data collections. This may include instructing the radar sensor 102 to rotate or scan at a certain speed based on a speed of the mobile platform 108. Additionally, the data processing system 106 receives and processes the data collected by the radar sensor 102.

The clutter map generation function 114 is performed by the data processing system 106 to generate a clutter map based on the data collected by the radar sensor 102. In the exemplary implementation, the clutter map is a two-dimensional representation in range and azimuth of clutter in the environment. Clutter may include any object in the environment such as terrain, animals, trees, buildings, and/or weather, as well as targets such as aircraft, ships, ground vehicles, and/or people. Based on a first data collection by the radar sensor 102, the data processing system 106 generates a base clutter map of the environment. The base clutter map is stored in a memory device and is the base to which all subsequent clutter maps are registered. Specifically, a fixed reference point or coordinate system is defined for the radar sensor 102 when the first data collection is collected. The fixed reference point or coordinate system may be defined as either an origin of a coordinate system or a position and orientation of the radar sensor 102.

Depending on the application, the clutter map may present the clutter in various ways. For example, in one implementation, the clutter map combines all of the clutter, including environmental objects and targets. In other implementations, the clutter map may be configured to separate the clutter and show only the environmental objects or the targets.

The clutter map management function 116 is performed by the data processing system 106 to update the base clutter map based on a second data collection and the motion of the mobile platform 108 detected by the motion sensor 104. Because the mobile platform 108 is in motion, two clutter maps generated based on the first and second data collections alone would show a particular object as being detected as two separate objects. Accordingly, for the second data collection and any subsequent data collections, the clutter map management function 116 receives the platform motion data for the mobile platform 108 when the second data collection (or subsequent data collections) occurs. The platform motion data indicates the position and orientation of the mobile platform 108 at the time of the second data collection relative to the fixed reference point or coordinate system. In one suitable implementation, the fixed reference point is a position and direction of the mobile platform 108 when the first data collection is collected to generate the base clutter map. Using the second data collection and associated platform motion data, the data processing system 106 updates the base clutter map to add new data associated with a portion of the environment that is newly within range of the radar sensor 102, to increase a confidence level of data associated with portions of the environment that have been detected previously by the radar sensor 102, and/or to remove data associated with a portion of the environment that is no longer within range of the radar sensor 102.

For example, in one implementation, to update the base clutter map, the data processing system 106 is configured to generate a second clutter map based on the second data collection. The data processing system 106 then registers pixel coordinates of the second clutter map to pixel coordinates of the base clutter map to adjust for the motion of the mobile platform 108. After being adjusted for the motion, the second clutter map is combined with the base clutter map.

The detection and tracking function 118 is performed by the data processing system 106 to detect positions of the clutter in the environment and track a position of the mobile platform 108 relative to the clutter. When the mobile platform 108 is on a path that would collide with the clutter, the data processing system 106 is configured to provide collision avoidance by automatically rerouting the path of the mobile platform 108.

In another implementation, the detection and tracking function 118 is performed by the data processing system 106 to detect objects that are moving within the environment. The track of a moving object may be monitored after multiple data collections, and the detection and tracking function 118 may use the track to monitor the moving object for suspicious behavior, such as perimeter crossings, circular flight path, etc. Any such suspicious behavior is communicated to the appropriate authority.

Figure 2:
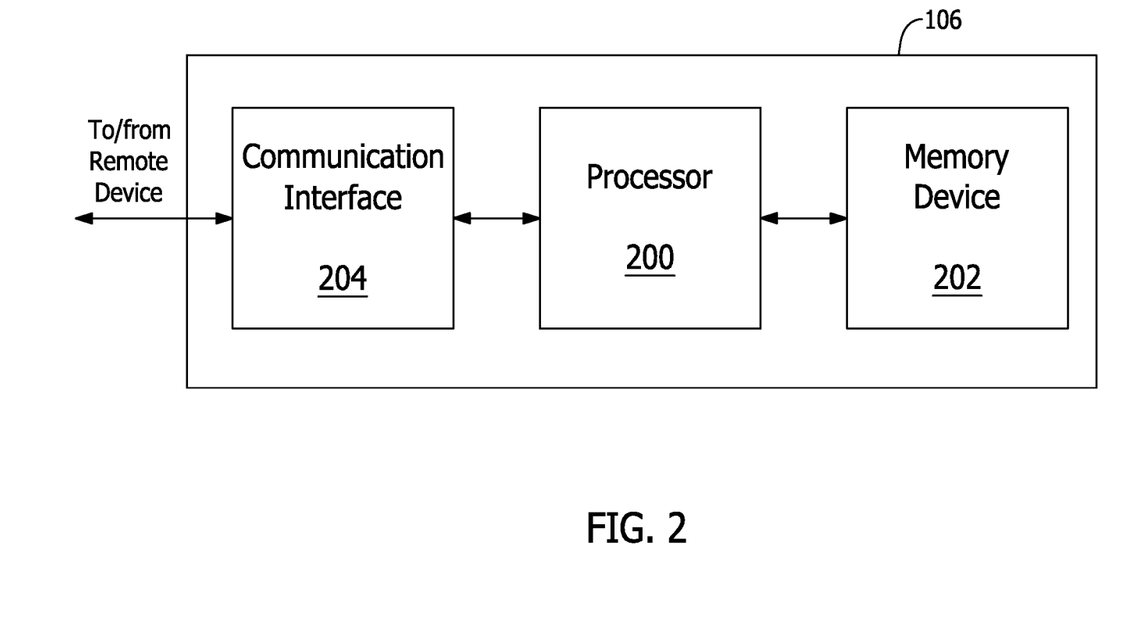
FIG. 2 illustrates an example configuration of the data processing system shown in FIG. 1, in accordance with one embodiment of the present disclosure.

FIG. 2 illustrates an example configuration of the data processing system shown in FIG. 1, in accordance with one embodiment of the present disclosure. The data processing system 106 includes a processor 200 for executing instructions. Instructions may be stored in a memory device 202. The processor 200 may include one or more processing units (e.g., in a multi-core configuration).

The processor 200 is operatively coupled to a communication interface 204, such that the data processing system 106 is capable of communicating with a remote device such as another data processing system 106, radar sensor 102, or motion sensor 104 (all shown in FIG. 1).

The processor 200 executes computer-executable instructions for implementing aspects of the disclosure. In some embodiments, the processor 200 is transformed into a special purpose microprocessor by executing computer-executable instructions or by otherwise being programmed.

Figure 3:
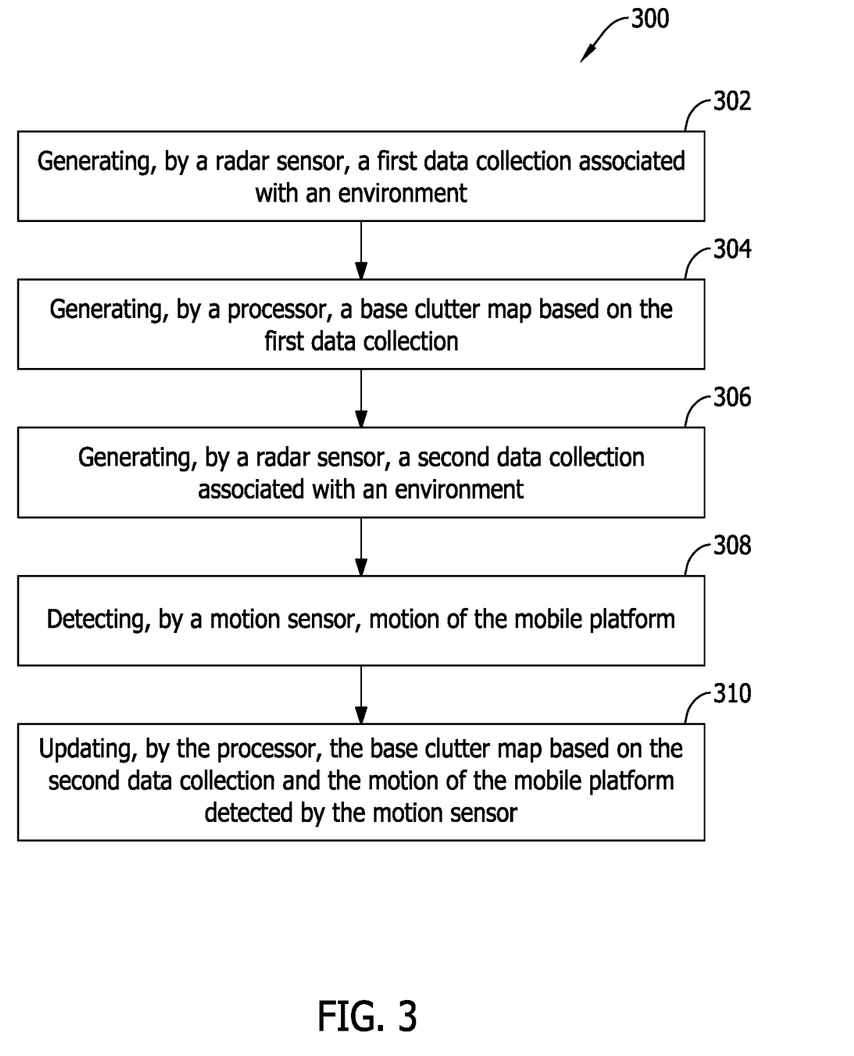
FIG. 3 is a flow chart of a method of operating the radar system shown in FIG. 1 on a mobile platform.

FIG. 3 is a flow chart of a method 300 of operating the radar system shown in FIG. 1 on a mobile platform. In the exemplary implementation, the method 300 includes generating 302, by the radar sensor 102, a first data collection associated with an environment. The processor 200 generates 304 a base clutter map based on the first data collection. The radar sensor 102 generates 306 a second data collection associated with the environment. The motion sensor 104 detects 308 motion of the mobile platform 108. The processor 200 updates 310 the base clutter map based on the second data collection and the motion of the mobile platform 108 detected by the motion sensor 104.

In one embodiment, updating the base clutter map further includes generating a second clutter map based on the second data collection. The processor 200 registers pixel coordinates of the second clutter map to pixel coordinates of the base clutter map based on the motion of the mobile platform 108, and then combines the second clutter map with the base clutter map.

In one embodiment, updating the base clutter map further includes adding new data associated with a portion of the environment that is newly within range of the radar sensor 102, and increasing a confidence level of data associated with portions of the environment that have been detected previously by the radar sensor 102.

In one embodiment, detecting motion of the mobile platform 108 includes detecting at least one of a distance and an orientation the mobile platform 108 has moved when the second data collection is collected relative to a fixed reference point or coordinate system defined for the mobile platform 108.

In one embodiment, generating the base clutter map includes generating a two-dimensional representation in range and azimuth of objects in the environment. The objects include at least one of an environmental object including at least one of terrain, an animal, a tree, a building, and weather, and a target including at least one of an aircraft, a ship, a ground vehicle, and a person.

In one embodiment, the method 300 further includes tracking a path of the mobile platform 108 relative to the clutter provided in the updated base clutter map, and implementing a collision avoidance function to automatically reroute the mobile platform 108 when the processor 200 determines the path would collide with the clutter.

In one embodiment, the method 300 further includes determining a track of a moving target based on the updated base clutter map, monitoring the moving target for compliance with predefined movement rules, and generating an alert when one of the predefined movement rules is broken.

Figure 4:
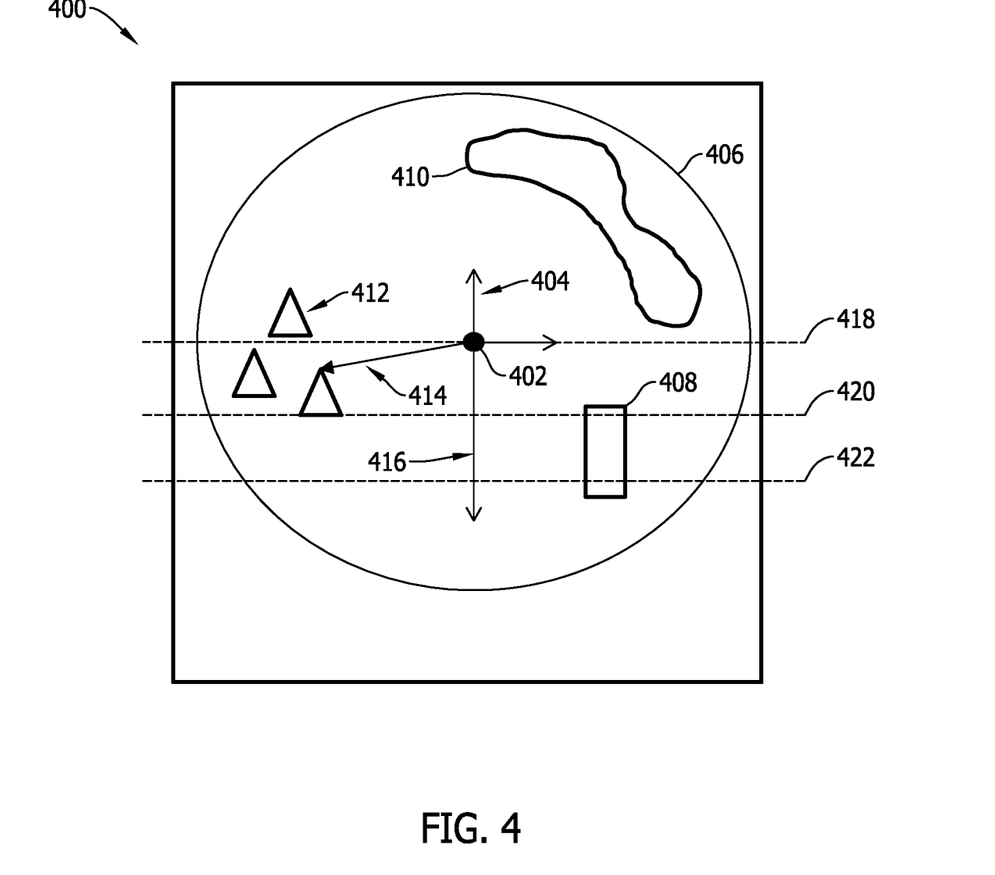
FIG. 4 is an exemplary clutter map.
Figure 5:
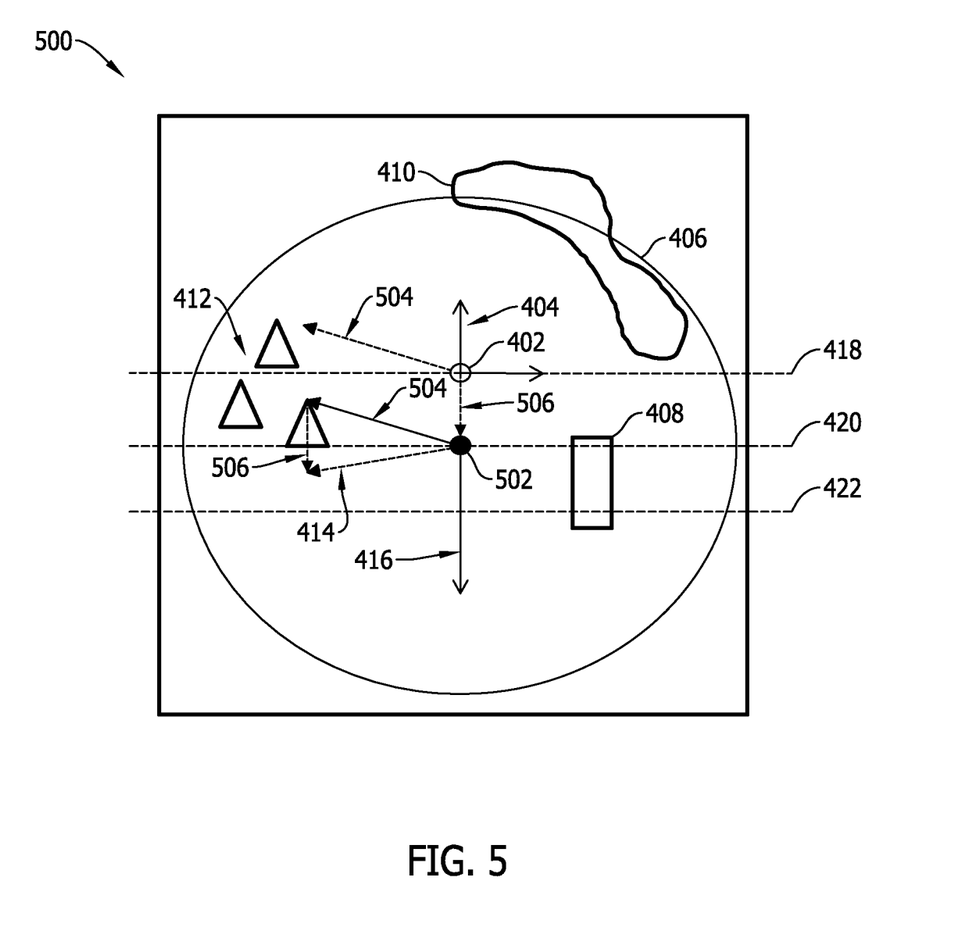
FIG. 5 is another exemplary clutter map.

FIG. 4 and FIG. 5 are exemplary clutter maps produced on a mobile platform, such as, for example, mobile platform 108. FIG. 4 is an exemplary prior, or first, clutter map 400 collected from an origin 402 representing the prior position of the mobile platform. Origin 402 of prior clutter map 400 also defines a two-dimensional reference frame 404 in the plane of collection. Reference frame 404 is shown as a cartesian reference frame. Alternatively, a range-azimuth reference frame may be defined. Prior clutter map 400 was generated by a collection in range and azimuth defined by a circular region 406. Prior clutter map 400 includes various simplified objects 408, 410, and 412 that provide radar returns.

Notably, a vector 414 originating at origin 402 illustrates the position of a given pixel among the group of objects 412 relative to reference frame 404. The mobile platform's direction of travel is represented by a directional vector 416. Prior clutter map 400 includes reference lines 418, 420, and 422 to aid in illustrating the mobile platform's motion.

FIG. 5 is an exemplary new, or second, clutter map 500 collected from an origin 502 representing a present position of the mobile platform. Due to the mobile platform's motion, the mobile platform's position and area of collection 406 have translated downward. For reference, the mobile platform's position now lies on reference line 420, as opposed to on reference line 418 in prior clutter map 400. Accordingly, the relative positions of objects 408, 410, and 412 have changed with respect to the mobile platform's position at origin 502. For example, a vector 504 originating at origin 502 illustrates the position of the same give pixel of the group of objects 412 relative to the present position of the mobile platform.

For reference, vector 504 is projected from origin 402 to illustrate the position of the pixel in group of objects 412 as detected in new clutter map 500 is a "null" position in prior clutter map 400, i.e., there is no radar return from that position in prior clutter map 400. Likewise, for reference, vector 414 is projected from origin 502 to illustrate that position is a null position in new clutter map 500, although there is a radar return at that position in prior clutter map 400. Accordingly, vector 504 is translated, or registered, to reference frame 404 located at origin 402 by a translation vector 506 that represents the mobile platform's motion. This procedure is then repeated for each pixel in new clutter map 500 to register new clutter map 500 to reference frame 404.

The above described embodiments of the radar system and methods described herein provide a low-cost marine radar sensor, or other off-the-shelf radar, implemented on a mobile platform. More specifically, embodiments described herein include the low-cost marine radar sensor and a motion sensor coupled to the mobile platform, and a data processing system that adjusts data collected by the radar sensor based on motion of the mobile platform detected by the motion sensor such that clutter maps generated from respective data collections may be combined.

An exemplary technical effect of the methods, systems, and apparatus described herein includes at least one of: (a) reducing complexity of processing by radar systems on mobile platforms; (b) reducing cost of processing systems for radar systems on mobile platforms by elimination of specialized hardware and software; (c) improving mobility and configurability of radar systems for mobile platforms by elimination of specialized hardware; and (d) improving configurability of radar systems for mobile platforms by simplification of real-time processing and data correlation.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A radar system for a mobile platform, comprising:
a radar sensor configured to collect data associated with an environment through which the mobile platform moves;
a motion sensor configured to detect motion of the mobile platform; and
a processor configured to:
generate a base clutter map based on a first data collection by said radar sensor;
generate a second clutter map based on a second data collection;
register pixel coordinates of the second clutter map to pixel coordinates of the base clutter map based on the motion of the mobile platform detected by said motion sensor; and
combine the base clutter map with the second clutter map.

2. The radar system according to claim 1, wherein to update the base clutter map, said processor is further configured to at least one of:
add new data associated with a portion of the environment that is newly within range of said radar sensor; and
increase a confidence level of data associated with portions of the environment that have been detected previously by said radar sensor.

3. The radar system according to claim 1, wherein to detect motion of the mobile platform, said motion sensor is configured to detect at least one of a distance and a direction the mobile platform has moved when the second data collection is collected relative to a fixed reference point defined for the mobile platform.

4. The radar system according to claim 3, wherein the fixed reference point defined for the mobile platform is defined as one of an origin of a coordinate system and a position and direction of the mobile platform when the first data collection is collected.

5. The radar system according to claim 1, wherein the base clutter map is a two-dimensional representation in range and azimuth of clutter in the environment.

6. The radar system according to claim 5, wherein the clutter comprises at least one of:
an environmental object including at least one of terrain, an animal, a tree, a building, and weather; and
a target including at least one of an aircraft, a ship, a ground vehicle, and a person.

7. The radar system according to claim 1, wherein said radar sensor comprises a commercial off-the-shelf marine radar.

8. The radar system according to claim 1, wherein said motion sensor comprises at least one of an Inertial Measurement Unit (IMU), an Inertial Navigation System (INS), a Global Positioning System (GPS), a map registration system, and a triangulation system.

9. The radar system according to claim 1, wherein the radar sensor is further configured to make the first data collection at a first position and to make the second data collection at a second position.

10. A method of operating a radar system on a mobile platform, comprising:
collecting, by a radar sensor, a first data collection associated with an environment through which the mobile platform moves;
generating, by a processor, a base clutter map based on the first data collection;
collecting, by the radar sensor, a second data collection associated with the environment;
detecting, by a motion sensor, motion of the mobile platform occurring in a time between collections;
registering pixel coordinates in the second data collection to pixel coordinates of the based clutter map based on the motion of the mobile platform detected by the motion sensor; and
updating, by the processor, the base clutter map based on the second data collection and the registering.

11. The method according to claim 10, wherein updating the base clutter map further comprises:
generating a second clutter map based on the second data collection; and
combining the second clutter map with the base clutter map.

12. The method according to claim 10, wherein updating the base clutter map further comprises:
adding new data associated with a portion of the environment that is newly within range of the radar sensor; and
increase a confidence level of data associated with portions of the environment that have been detected previously by the radar sensor.

13. The method according to claim 10, wherein detecting motion of the mobile platform comprises detecting at least one of a distance, a direction, and a rotation the mobile platform has experienced when the second data collection is collected relative to a fixed reference point defined for the mobile platform.

14. The method according to claim 10, wherein generating the base clutter map comprises generating a two-dimensional representation in range and azimuth of clutter in the environment, wherein the clutter includes at least one of:
an environmental object including at least one of terrain, an animal, a tree, a building, and weather; and
a target including at least one of an aircraft, a ship, a ground vehicle, and a person.

15. The method according to claim 10, further comprising:
tracking, by the processor, a path of the mobile platform, the path being defined relative to the clutter provided in the updated base clutter map; and
implementing a collision avoidance function to automatically reroute the mobile platform when the processor determines the path would collide with the clutter.

16. The method according to claim 10, further comprising:
determining, by the processor, a track of a moving target based on the updated base clutter map;
monitoring the moving target for compliance with predefined movement rules; and
generating an alert when one of the predefined movement rules is broken.

17. At least one non-transitory computer-readable storage media having computer-executable instructions embodied thereon, wherein when executed by at least one processor, the computer-executable instructions cause the processor to:
generate a base clutter map based on a first data collection associated with an environment through which a mobile platform moves, the first data collection received from a radar sensor coupled to the mobile platform;
receive a second data collection associated with the environment from the radar sensor;

receive motion of the mobile platform and detected by a motion sensor coupled to the mobile platform;

register pixel coordinates of the second data collection to pixel coordinates of the base clutter map based on the motion of the mobile platform detected by the motion sensor; and update the base clutter map based on the second data collection and the motion of the mobile platform detected by the motion sensor.

18. The computer-readable storage media of claim 17, wherein to update the base clutter map, the computer-executable instructions further cause the processor to:

generate a second clutter map based on the second data collection;

combine the second clutter map with the base clutter map.

19. The computer-readable storage media of claim 17, wherein to update the base clutter map, the computer-executable instructions further cause the processor to:

add new data associated with a portion of the environment that is newly within range of the radar sensor; and increase a confidence level of data associated with portions of the environment that have been detected previously by the radar sensor.

20. The computer-readable storage media of claim 17, wherein to generate the base clutter map, the computer-executable instructions further cause the processor to generate a two-dimensional representation in range and azimuth of clutter in the environment, wherein the clutter includes at least one of an environmental object including at least one of terrain, an animal, a tree, a building, and weather, and a target including at least one of an aircraft, a ship, a ground vehicle, and a person.

\* \* \* \* \*